(12) United States Patent
Ishikawa

(10) Patent No.: US 6,269,204 B1
(45) Date of Patent: Jul. 31, 2001

(54) METHOD AND SYSTEM FOR MONITORING OF OPTICAL TRANSMISSION LINES

(75) Inventor: Tomohisa Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/405,216

(22) Filed: Sep. 27, 1999

(30) Foreign Application Priority Data

Dec. 16, 1998 (JP) .................................................. 10-357294

(51) Int. Cl.[7] .................................................. G02B 6/28
(52) U.S. Cl. .................................................. 385/24; 385/15
(58) Field of Search .................................. 385/24, 14, 15, 385/16, 17; 359/109, 124

(56) References Cited

U.S. PATENT DOCUMENTS 5,212,577 * 5/1993 Nakamura et al. .................. 359/124

* cited by examiner

Primary Examiner—Hung Xuan Dang
(74) Attorney, Agent, or Firm—Staas & Halsey, LLP

(57) ABSTRACT

Disclosed herein is a system including a first optical fiber transmission line, a plurality of second optical fiber transmission lines, a branching section for optically connecting these first and second optical fiber transmission lines, a monitor device optically connected to the first optical fiber transmission line, and a plurality of reflecting sections respectively provided in the vicinity of open ends of the second optical fiber transmission lines. The monitor device outputs monitor light through the first optical fiber transmission line and the branching section to each of the second optical fiber transmission lines. The reflecting sections reflect the monitor light to thereby generate identification optical signals having different patterns for respectively identifying the second optical fiber transmission lines. With this configuration, the monitor device can detect an abnormality in each of the second optical fiber transmission lines according to the presence of absence of the corresponding identification optical signal.

20 Claims, 14 Drawing Sheets

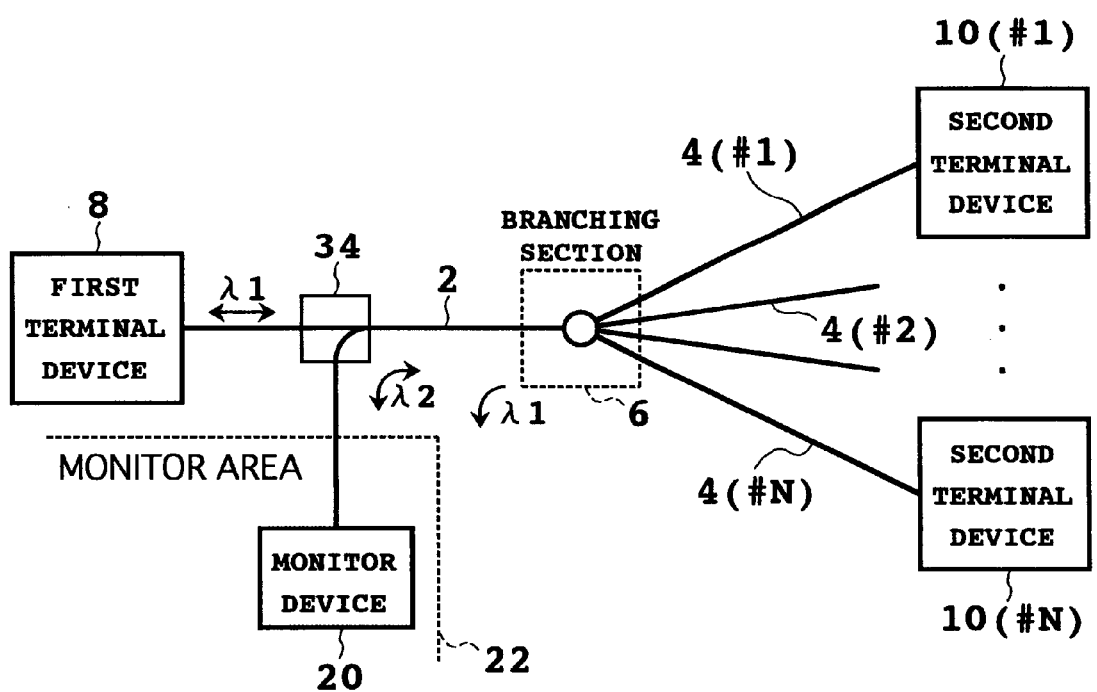
F I G. 6

F I G. 9
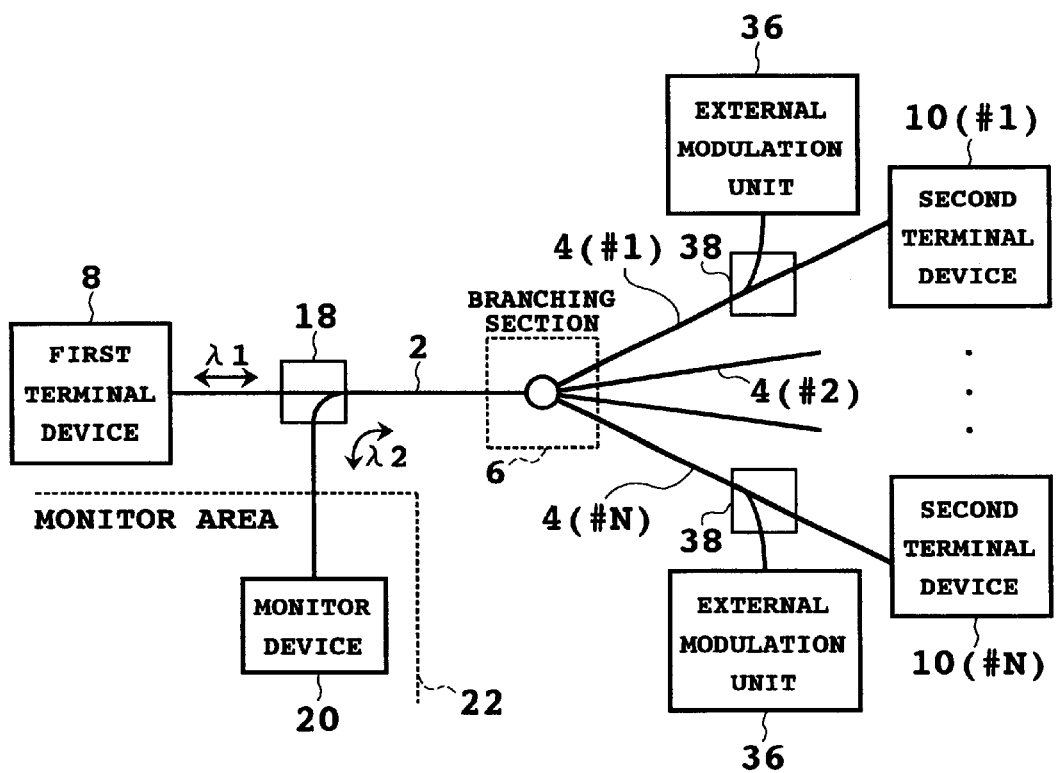

METHOD AND SYSTEM FOR MONITORING OF OPTICAL TRANSMISSION LINES

BACKGROUND OF THE INVENTION

1. Field of the Invention

The present invention relates generally to a method and system for monitoring (or supervising) of optical transmission lines, and more particularly to a method and system for monitoring of optical transmission lines suitable for an optical network system for performing transmission between a first terminal device (e.g., a central office) and a plurality of second terminal devices (e.g., subscriber terminals).

2. Description of the Related Art

Referring to FIG. 1, there is shown a conventional system for monitoring of optical transmission lines. This system includes a first optical fiber transmission line 2, N second optical fiber transmission lines 4(#1) to 4(#N) (N is an integer greater than 1), and a branching section 6 for optically connecting the first optical fiber transmission line 2 and the second optical fiber transmission lines 4(#1) to 4(#N). The branching section 6 is provided by an optical star coupler, for example.

A first terminal device 8 is optically connected to an open end of the first optical fiber transmission line 2, i.e., an end of the first optical fiber transmission line 2 opposite to the branching section 6. N second terminal devices 10(#1) to 10(#N) are optically connected to open ends of the second optical fiber transmission lines 4(#1) to 4(#N), respectively. For example, the first terminal device 8 is a central office in an optical fiber network system, and the second terminal devices 10(#1) to 10(#N) are subscriber terminals in the optical fiber network system. Between the first terminal device 8 and each of the second terminal devices 10(#1) to 10(#N), one-way or two-way communication or transmission using an optical signal having a wavelength $\lambda 1$ is carried out.

N monitor devices (or supervisory devices) 14(#1) to 14(#N) are provided in a monitor area (or supervisory area) 12, so as to detect an abnormality such as a break in each of the second optical fiber transmission lines 4(#1) to 4(#N). The monitor devices 14(#1) to 14(#N) are optically connected to the second optical fiber transmission lines 4(#1) to 4(#N) by WDM (wavelength division multiplexing) couplers 16, respectively. The monitor devices 14(#1) to 14(#N) perform OTDR (optical time domain reflectometry), for example, using monitor light (or supervisory light) having a wavelength $\lambda 2$ to locate abnormal points in the second optical fiber transmission lines 4(#1) to 4(#N), respectively, or to measure loss characteristics of the second optical fiber transmission lines 4(#1) to 4(#N), respectively.

In the conventional system shown in FIG. 1, the branching section 6 is included in the monitor area 12 where the monitor devices 14(#1) to 14(#N) are provided. Accordingly, many optical fibers are present in the monitor area 12, so that the wiring of the optical fibers in the monitor area 12 is complicated. Further, the plural monitor devices 14(#1) to 14(#N) respectively corresponding to the second optical fiber transmission lines 4(#1) to 4(#N) are required.

SUMMARY OF THE INVENTION

It is therefore an object of the present invention to provide a method and system which can monitor (or supervise) a plurality of optical fiber transmission lines in a network by using a single monitor device.

In accordance with a first aspect of the present invention, there is provided a system comprising a first optical fiber transmission line; a plurality of second optical fiber transmission lines; a branching section for optically connecting the first optical fiber transmission line and the plurality of second optical fiber transmission lines; a monitor device (or supervisory device) optically connected to the first optical fiber transmission line; and a plurality of reflecting sections respectively provided in the vicinity of open ends of the plurality of second optical fiber transmission lines. The monitor device outputs monitor light (or supervisory light) through the first optical fiber transmission line and the branching section to each of the second optical fiber transmission lines. The reflecting sections reflect the monitor light to thereby generate identification optical signals having different patterns for respectively identifying the second optical fiber transmission lines.

With this configuration, each reflecting section generates the identification optical signal having the pattern for identifying the corresponding second optical fiber transmission line. Accordingly, the monitor device can identify an abnormal one of the second optical fiber transmission lines according to the presence or absence of the corresponding identification optical signal, for example, and can also locate an abnormal point in this abnormal second optical fiber transmission line identified above by applying OTDR. Thus, the plural second optical fiber transmission lines can be monitored by the single monitor device according to the present invention.

In accordance with a second aspect of the present invention, there is provided a system comprising a first optical fiber transmission line; a plurality of second optical fiber transmission lines; a branching section for optically connecting the first optical fiber transmission line and the plurality of second optical fiber transmission lines; a monitor device optically connected to the first optical fiber transmission line; a first terminal device optically connected to an open end of the first optical fiber transmission line; and a plurality of second terminal devices optically connected to open ends of the plurality of second optical fiber transmission lines, respectively. The second terminal devices generate identification signals for respectively identifying the second optical fiber transmission lines. The monitor device detects an abnormality in each of the second optical fiber transmission lines according to the corresponding identification signal.

In accordance with a third aspect of the present invention, there is provided a system comprising a first optical fiber transmission line; a plurality of second optical fiber transmission lines; a branching section for optically connecting the first optical fiber transmission line and the plurality of second optical fiber transmission lines; a monitor device optically connected to the first optical fiber transmission line; and a plurality of external modulation units optically connected to the plurality of second optical fiber transmission lines in the vicinity of open ends of the second optical fiber transmission lines, respectively. The monitor device outputs monitor light through the first optical fiber transmission line and the branching section to each of the second optical fiber transmission lines. The external modulation units modulate the monitor light according to identification signals for respectively identifying the second optical fiber transmission lines to thereby generate identification optical signals, respectively.

In accordance with a fourth aspect of the present invention, there is provided a system comprising a first optical fiber transmission line; N second optical fiber transmission lines (N is an integer greater than 1); a branching section for optically connecting the first optical fiber transmission line and the plurality of second optical fiber transmission lines; a 1×N optical switch having a first port and N second ports, the second ports being optically connected to the second optical fiber transmission lines, respectively, in the vicinity of the branching section, the first port being selectively connected to one of the second ports; and a monitor device optically connected to the first port of the 1×N optical switch for outputting monitor light to each of the second optical fiber transmission lines.

In accordance with a fifth aspect of the present invention, there is provided a method for monitoring a plurality of optical fiber transmission lines optically connected together by a branching section, comprising the steps of (a) identifying an abnormal one of the optical fiber transmission lines; and (b) locating an abnormal point in the abnormal optical fiber transmission line identified above.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 6 is a block diagram showing a second preferred embodiment of the system according to the present invention;

FIG. 9 is a block diagram showing a third preferred embodiment of the system according to the present invention;

DETAILED DESCRIPTION OF THE PREFERRED EMBODIMENTS

Figure 1A:
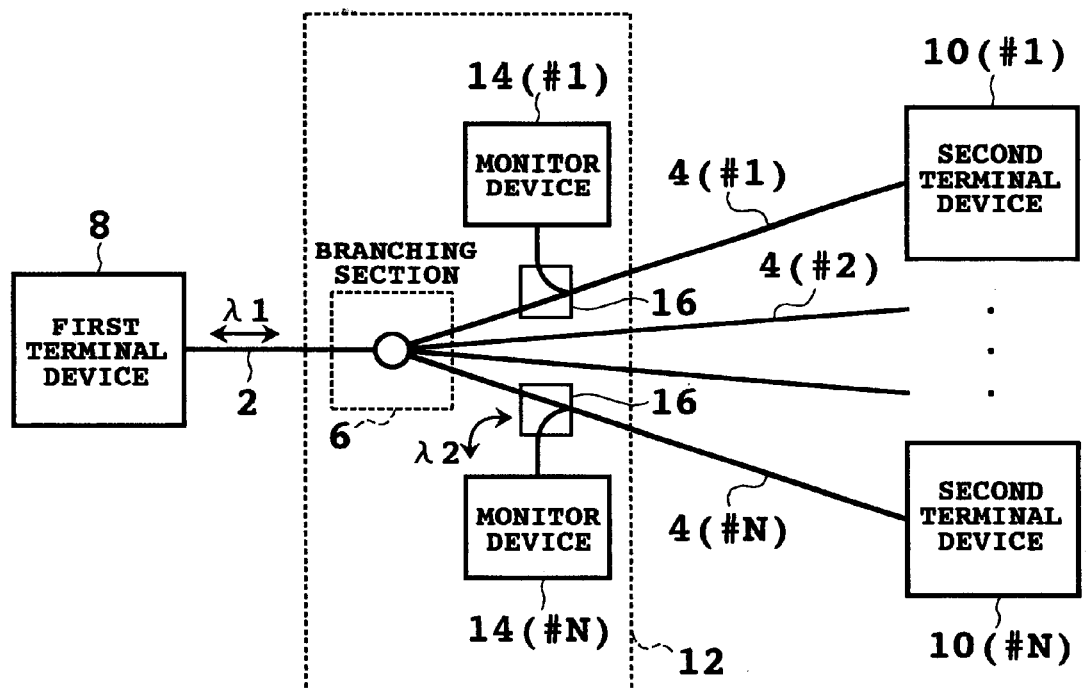
FIG. 1 is a block diagram of a conventional system for monitoring of optical transmission lines.

Some preferred embodiments of the present invention will now be described in detail with reference to the attached drawings. Throughout the drawings substantially the same parts are denoted by the same reference numerals.

Figure 2:
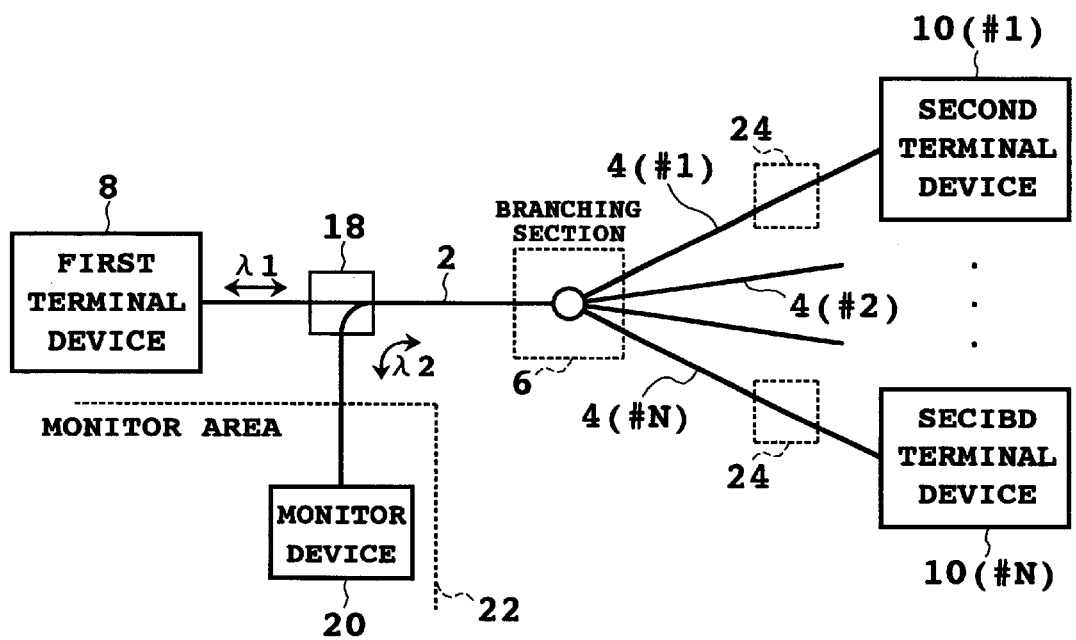
FIG. 2 is a block diagram showing a first preferred embodiment of the system according to the present invention.

Referring to FIG. 2, there is shown a first preferred embodiment of the system according to the present invention. This system includes a first optical fiber transmission line 2, N second optical fiber transmission lines 4(#1) to 4(#N) (N is an integer greater than 1), and a branching section 6 for optically connecting the first optical fiber transmission line 2 and the second optical fiber transmission lines 4(#1) to 4(#N). The branching section 6 is provided by an optical star coupler, for example.

A first terminal device 8 is optically connected to an open end of the first optical fiber transmission line 2, i.e., an end of the first optical fiber transmission line 2 opposite to the branching section 6. N second terminal devices 10(#1) to 10(#N) are optically connected to open ends of the second optical fiber transmission lines 4(#1) to 4(#N), respectively. For example, the first terminal device 8 is a central office in an optical fiber network system, and the second terminal devices 10(#1) to 10(#N) are subscriber terminals in the optical fiber network system. Between the first terminal device 8 and each of the second terminal devices 10(#1) to 10(#N), one-way or two-way communication or transmission using an optical signal having a wavelength $\lambda 1$ is carried out.

In this preferred embodiment, a single monitor device (or supervisory device) 20 is optically connected through a WDM coupler 18 to the first optical fiber transmission line 2, so as to monitor (or supervise) each of the second optical fiber transmission lines 4(#1) to 4(#N). A monitor area 22 including the monitor device 20 is accordingly provided in the vicinity of the first terminal device 8.

The WDM coupler 18 optically couples the first terminal device 8 and the branching section 6 by the wavelength $\lambda 1$ of the optical signal for information transmission between the first terminal device 8 and the second terminal devices 10(#1) to 10(#N), and optically couples the monitor device 20 and the branching section 6 by a wavelength $\lambda 2$ different from the wavelength $\lambda 1$. Accordingly, the monitor device 20 can output monitor light (or supervisory light) having the wavelength $\lambda 2$ through the first optical fiber transmission line 2 and the branching section 6 to each of the second optical fiber transmission lines 4(#1) to 4(#N).

N reflecting sections 24 characteristic of this preferred embodiment are respectively provided in the vicinity of the open ends of the second optical fiber transmission lines 4(#1) to 4(#N) (to which open ends the second terminal devices 10(#1) to 10(#N) are connected). The reflecting sections 24 reflect the monitor light supplied from the monitor device 20 to thereby generate identification optical signals having different patterns for respectively identifying the second optical fiber transmission lines 4(#1) to 4(#N). Accordingly, each identification optical signal has the wavelength $\lambda 2$.

Figure 3:
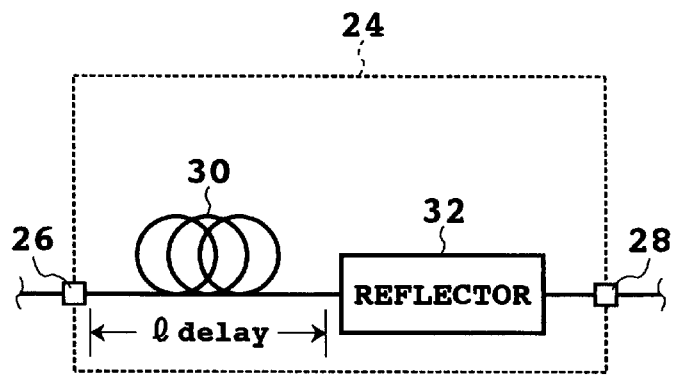
FIG. 3 is a block diagram showing a reflecting section 24 shown in FIG. 2.

FIG. 3 is a block diagram showing a preferred embodiment of each reflecting section 24 shown in FIG. 2. Each reflecting section 24 is composed of optical connectors 26 and 28 connected to each of the second optical fiber transmission lines 4(#1) to 4(#N) on the branching section 6 side and on the corresponding second terminal device side, respectively, and a timing adjusting optical fiber 30 and a reflector 32 cascaded between the optical connectors 26 and 28. Accordingly, the timing adjusting optical fiber 30 and the reflector 32 are arranged in this order from the branching section 6 side. The reflector 32 generates the corresponding identification optical signal with a given timing. The principle of generation of the identification optical signals will now be described.

Figure 4A:
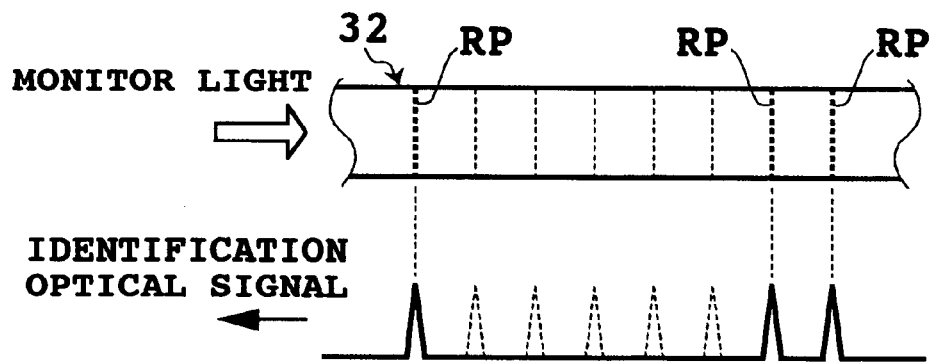
FIGS. 4A and 4B are diagrams for illustrating an example of the patterns of identification optical signals in the first preferred embodiment.
Figure 4B:
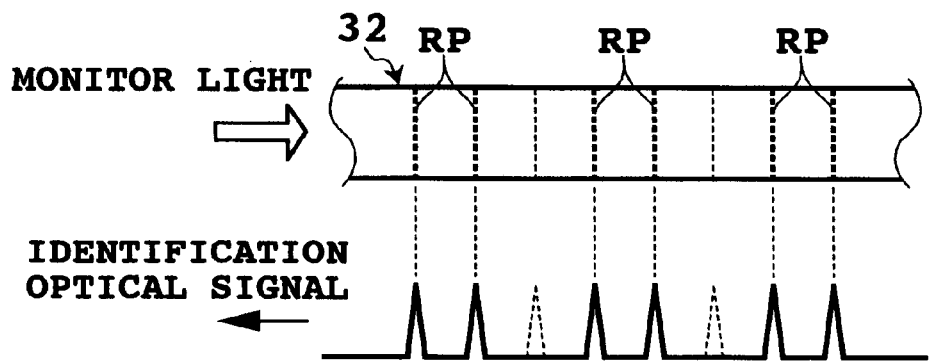

FIGS. 4A and 4B are diagrams for illustrating an example of the patterns of the identification optical signals. Each reflector 32 provided by an optical fiber, for example, has a plurality of positions arranged in its longitudinal direction at given intervals, and one or more reflection points RP are set at one or more inherent positions selected from the above positions. For example, the reflector 32 in the reflecting section 24 corresponding to the second optical fiber transmission line 4(#1) has a plurality of reflection points RP at the first, seventh, and eighth positions counted from the branching section 6 side as shown in FIG. 4A, and the monitor light supplied to this reflector 32 is reflected at these reflection points RP to thereby generate an identification optical signal having a pattern determined according to the positions of the reflection points RP.

Further, as shown in FIG. 4B, the reflector 32 in the reflecting section 24 corresponding to the second optical fiber transmission line 4(#N) has a plurality of reflection points RP at the first, second, fourth, fifth, seventh, and eighth positions counted from the branching section 6 side, thereby generating an identification optical signal having a pattern different from the pattern shown in FIG. 4A and inherent to the optical fiber transmission line 4(#N).

Letting n denote the number of positions to which the reflection points RP are to be allocated, n is given by the number of digits of N in binary notation, for example, because n and N are decimal numbers. In the example shown in FIGS. 4A and 4B, n =8, so that N can take a maximum number of 255. In the case that n =4, N can take a maximum number of 15.

Each reflection point RP may be provided by a splice point between optical fibers, for example. In this case, the reflectance at the splice point is large enough to generate the identification optical signal and small enough not to largely attenuate the optical signal for information transmission, so that the splice point is useful in providing each reflecting section in the present invention. The splice point can be easily fabricated by a fusion splicing apparatus for optical fiber or fibers.

In this preferred embodiment, the single monitor device 20 is used, and it is accordingly preferable that the identification optical signals respectively corresponding to the second optical fiber transmission lines 4(#1) to 4(#N) are not to be returned with the same timing. To this end, each reflecting section 24 employs the timing adjusting optical fiber 30 as shown in FIG. 3. By setting different delay periods "1 delay" in the timing adjusting optical fibers 30 for the second optical fiber transmission lines 4(#1) to 4(#N), the identification optical signals respectively corresponding to the second optical fiber transmission lines 4(#1) to 4(#N) can be returned to the monitor device 20 with different timings.

In this manner, each reflecting section 24 in this preferred embodiment reflects the monitor light to thereby generate an identification optical signal having a pattern for identifying the corresponding second optical fiber transmission line. Accordingly, the monitor device 20 can detect whether or not each second optical fiber transmission line is abnormal according to the presence or absence of the corresponding identification optical signal, for example. A specific example thereof will now be described.

Figure 5A:
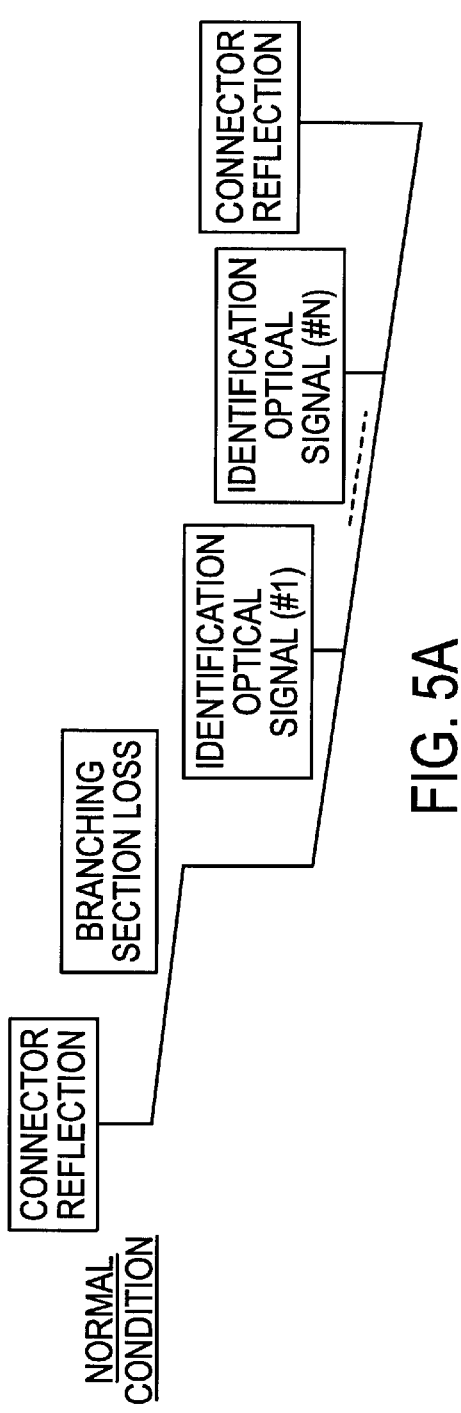
FIGS. 5A and 5B are diagrams for illustrating a method of locating an abnormal point in the first preferred embodiment.
Figure 5B:
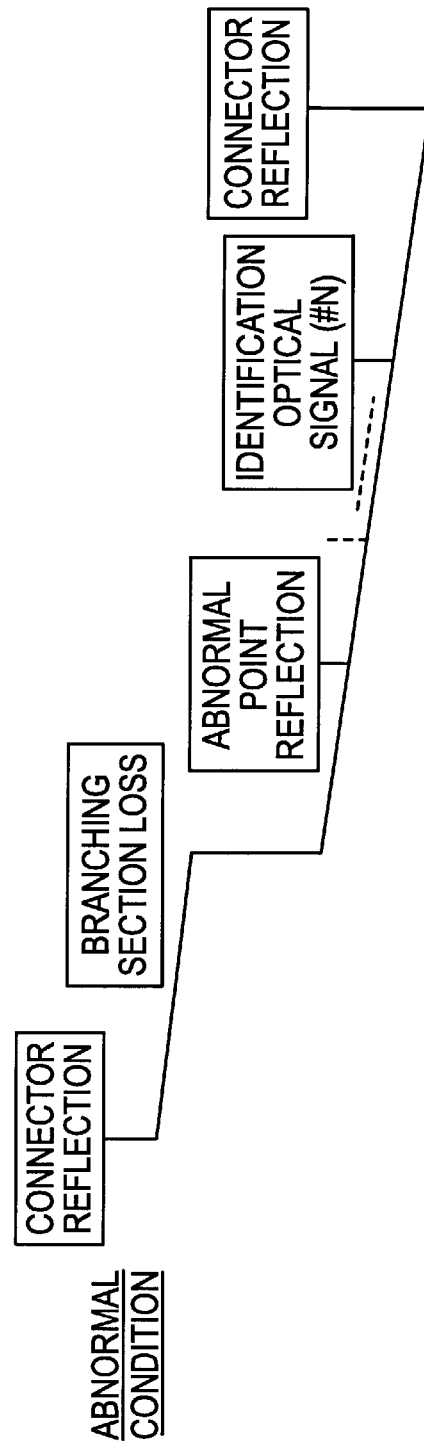

Referring to FIGS. 5A and 5B, there is shown an example of the results of measurement in the monitor device 20 in the normal condition and abnormal condition of the second optical fiber transmission lines, respectively.

The monitor device 20 performs OTDR by using the monitor light. In the case that all of the second optical fiber transmission lines 4(#1) to 4(#N) are normal, the result of measurement shown in FIG. 5A is obtained so as to show the time-series appearance of a waveform due to connector reflection concerning the monitor device 20, a waveform due to losses in the branching section 6, identification optical signals (#1) to (#N) respectively corresponding to the second optical fiber transmission lines 4(#1) to 4(#N), and a waveform due to connector reflection concerning each of the second terminal devices 10(#1) to 10(#N) in this order. In each of FIGS. 5A and 5B, the vertical axis (direction) represents optical power level, and the horizontal axis (direction) represents time. In the result of measurement shown in FIG. 5A, the identification optical signals (#1) to (#N) for all the second optical fiber transmission lines 4(#1) to 4(#N) are obtained, so that it is determined that all the second optical fiber transmission lines 4(#1) to 4(#N) are in the normal condition.

In the result of measurement shown in FIG. 5B, only the identification optical signal (#1) corresponding to the second optical fiber transmission line 4(#1) is not detected in the monitor device 20. Accordingly, it is determined that the second optical fiber transmission line 4(#1) is in the abnormal condition. Furthermore, in the result of measurement shown in FIG. 5B, a waveform due to abnormal point reflection between the branching section 6 and the reflecting section 24 is obtained. Accordingly, since the second optical fiber transmission line 4(#1) has been already identified as an abnormal optical fiber transmission line, the abnormal point in the second optical fiber transmission line 4(#1) can be located according to the waveform due to abnormal point reflection.

In this manner, an abnormal optical fiber transmission line is first identified and an abnormal point in this abnormal optical fiber transmission line identified above is next located according to this preferred embodiment. Accordingly, it is sufficient to provide a single monitor device for performing OTDR, for example.

Further, since the wavelength $\lambda 1$ of the optical signal for information transmission and the wavelength $\lambda 2$ of the monitor light are different from each other, the monitoring of the optical fiber transmission lines can be performed while information transmission is being performed.

In the result of measurement shown in FIG. 5B, the abnormal point in the optical fiber transmission line 4(#1) is a break point, for example. In OTDR, the tilt in the result of measurement gives a loss characteristic of an optical fiber transmission line, so that an abnormality in the loss characteristic may be detected according to the present invention.

FIG. 6 is a block diagram showing a second preferred embodiment of the system according to the present invention. In this preferred embodiment, the second terminal devices 10(#1) to 10(#N) generate identification signals for respectively identifying the second optical fiber transmission lines 4(#1) to 4(#N), so as to detect an abnormality in each of the second optical fiber transmission lines 4(#1) to 4(#N) without providing the reflecting sections 24 shown in FIG. 2. The monitor device 20 detects the abnormality in each of the second optical fiber transmission lines 4(#1) to 4(#N) according to the corresponding identification signal.

In the case that information transmission is performed by an optical signal having a wavelength λ1 between the first terminal device 8 and the second terminal devices 10(#1) to 10(#N), each identification signal can be transmitted by the optical signal or in association with the optical signal. Accordingly, the wavelength related to each identification signal is λ1, and the monitor device 20 is therefore optically connected to the first optical fiber transmission line 2 by a usual optical coupler 34 rather than a WDM coupler. The monitor device 20 can identify any abnormal one of the second optical fiber transmission lines 4(#1) to 4(#N) according to the corresponding identification signal, and can thereafter locate an abnormal point in this abnormal second optical fiber transmission line by OTDR using monitor light having a wavelength λ2 as similarly to the first preferred embodiment, for example.

Figure 7A:
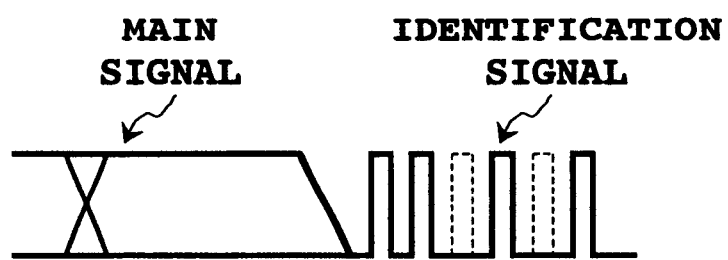
FIGS. 7A and 7B are diagrams showing an example of identification signals in the second preferred embodiment.
Figure 7B:
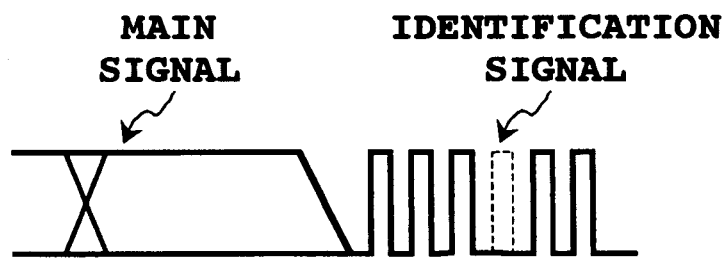

Referring to FIGS. 7A and 7B, there is shown an example of the identification signals in the second preferred embodiment shown in FIG. 6. As shown in FIG. 7A, an identification signal inherent to one of the second optical fiber transmission lines 4(#1) to 4(#N) is preliminarily added to the trailing end of a main signal for information transmission. This identification signal has a pattern determined according to the corresponding second optical fiber transmission line. As shown in FIG. 7B, an identification signal having a pattern different from the pattern of the identification signal shown in FIG. 7A for identifying another one of the second optical fiber transmission lines 4(#1) to 4(#N) is preliminarily added to the trailing end of the main signal.

In this manner, the main signal and each identification signal are time-division multiplexed to allow easy transmission of the identification signal from each of the second terminal devices 10(#1) to 10(#N) to the monitor device 20. As a result, the monitor device 20 can detect an abnormality in each of the second optical fiber transmission lines 4(#1) to 4(#N) according to the presence or absence of the corresponding identification signal as similarly to the first preferred embodiment.

Figure 8A:
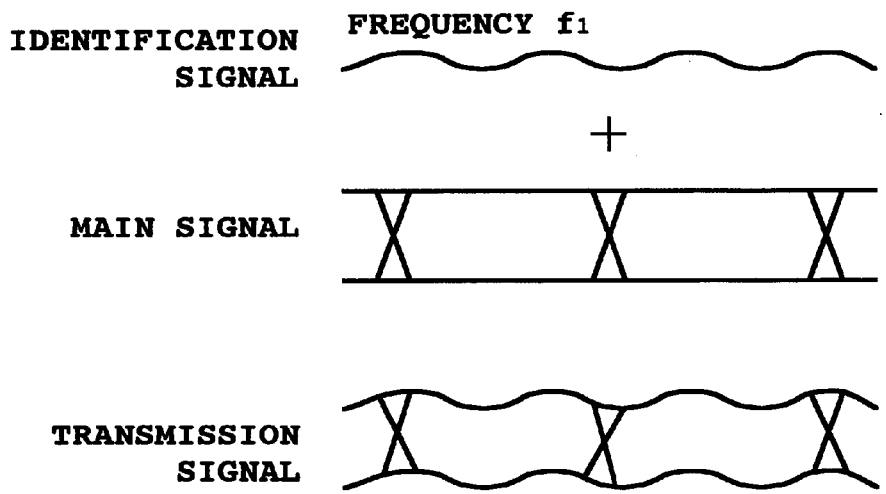
FIGS. 8A and 8B are diagrams showing another example of the identification signals in the second preferred embodiment.
Figure 8B:
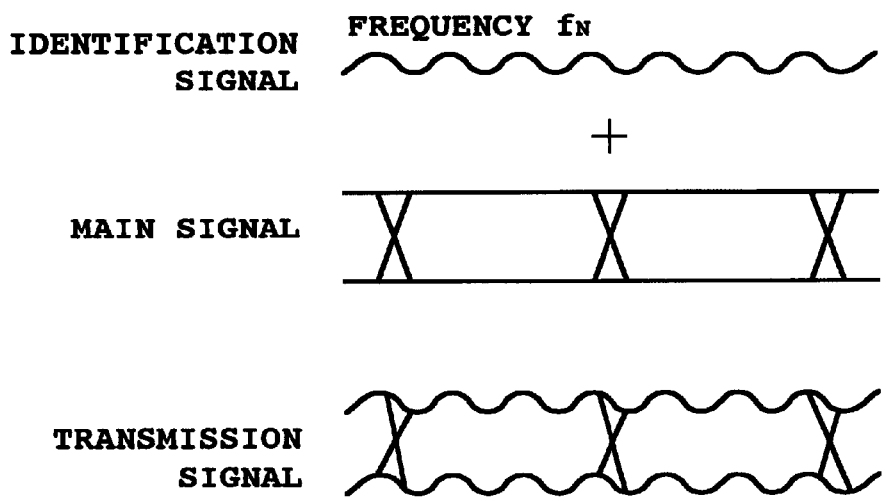

FIGS. 8A and 8B are diagrams showing another example of the identification signals in the second preferred embodiment shown in FIG. 6. As shown in FIG. 8A, an identification signal having a frequency $f_1$, is superimposed on a main signal to obtain a transmission signal in the second terminal device 10(#1). As shown in FIG. 8B, a different identification signal having a frequency $f_N$ is superimposed on the main signal to obtain a different transmission signal in the second terminal device 10(#N).

In this manner, an identification signal having a frequency determined according to each of the second optical fiber transmission lines is preliminarily superimposed on the main signal. The monitor device 20 extracts the identification signal from the transmission signal to thereby detect the presence or absence of the identification signal, thus identifying any abnormal one of the second optical fiber transmission lines according to the result of detection. Further, by using monitor light having a wavelength λ2 different from the wavelength λ1 of an optical signal for transmitting the main signal, the monitor device 20 can locate an abnormal point in the abnormal second optical fiber transmission line identified above as similarly to the first preferred embodiment.

FIG. 9 is a block diagram showing a third preferred embodiment of the system according to the present invention. In this preferred embodiment, N external modulation units 36 are optically connected to the second optical fiber transmission lines 4(#1) to 4(#N) in the vicinity of the open ends thereof, respectively. The optical connection between the external modulation units 36 and the respective second optical fiber transmission lines 4(#1) to 4(#N) is effected by N WDM couplers 38.

This preferred embodiment is similar to the first preferred embodiment shown in FIG. 2 in the point that a monitor device 20 is optically connected to the first optical fiber transmission line 2 by a WDM coupler 18. The monitor device 20 outputs monitor light through the first optical fiber transmission line 2 and the branching section 6 to each of the second optical fiber transmission lines 4(#1) to 4(#N).

The external modulation units 36 modulate the supplied monitor light according to identification signals for respectively identifying the second optical fiber transmission lines 4(#1) to 4(#N) to thereby generate identification optical signals. Accordingly, as similarly to the first preferred embodiment, the monitor device 20 can identify any abnormal one of the second optical fiber transmission lines 4(#1) to 4(#N) according to the corresponding identification optical signal and can locate an abnormal point in the abnormal optical fiber transmission line identified above by performing OTDR, for example.

Figure 10:
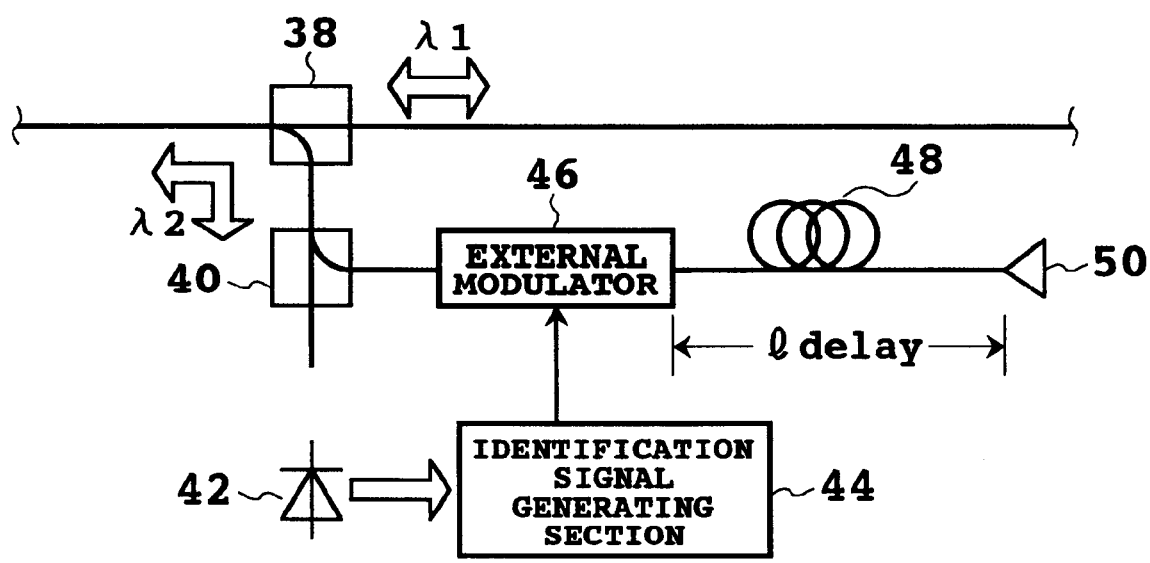
FIG. 10 is a block diagram showing a preferred embodiment of an external modulation unit 36 shown in FIG. 9.

Referring to FIG. 10, there is shown a preferred embodiment of each external modulation unit 36 shown in FIG. 9. Each external modulation unit 36 includes an optical coupler 40, photodetector 42, identification signal generating section 44, external modulator 46, timing adjusting optical fiber 48, and total reflector 50.

Monitor light having a wavelength λ2 dropped from each second optical fiber transmission line by the corresponding WDM coupler 38 is divided into two branch beams by the optical coupler 40. One of the two branch beams is supplied to the photodetector 42 such as a photodiode, and the other branch beam is passed through the external modulator 46, then reciprocating the timing adjusting optical fiber 48 by the presence of the total reflector 50, and being returned to the external modulator 46. The identification signal generating section 44 outputs an identification signal according to the timing of photodetection by the photodetector 42, and the external modulator 46 modulates the light supplied from the timing adjusting optical fiber 48 according to the identification signal supplied from the identification signal generating section 44, thereby generating an identification optical signal. The identification optical signal is supplied through the optical coupler 40 and the WDM coupler 38 in this order to the corresponding second optical fiber transmission line.

Figure 11A:
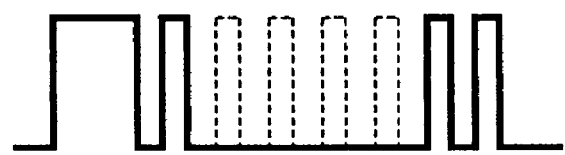
FIGS. 11A and 11B are diagrams showing an example of identification signals in the third preferred embodiment.
Figure 11B:
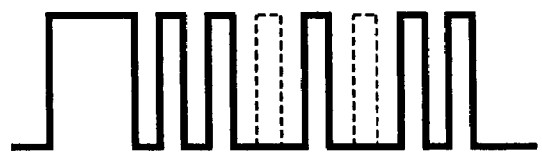

Referring to FIGS. 11A and 11B, there is shown an example of the identification signals in the third preferred embodiment. For example, the external modulation unit 36 corresponding to the second optical fiber transmission line 4(#1) generates an identification optical signal having a pattern inherent to the optical fiber transmission line 4(#1) as shown in FIG. 11A. In this case, the external modulation unit 36 corresponding to the optical fiber transmission line 4(#N) as an example of any second optical fiber transmission line other than the optical fiber transmission line 4(#1) generates an identification optical signal having a pattern as shown in FIG. 11B, which pattern is different from the pattern shown in FIG. 11A. In this manner, by making the patterns of the identification optical signals for all the second optical fiber transmission lines 4(#1) to 4(#N) different from each other, the monitor device 20 can easily identify any abnormal one of the second optical fiber transmission lines 4(#1) to 4(#N) in which any abnormality such as a break has occurred, according to the presence or absence of the corresponding identification optical signal.

Figure 12A:
FIGS. 12A and 12B are diagrams showing another example of the identification signals in the third preferred embodiment.
Figure 12B:

Referring to FIGS. 12A and 12B, there is shown another example of the identification signals in the third preferred embodiment. In this example, two identification signals having different frequencies are shown. Each external modulation unit 36 generates an identification optical signal according to the corresponding identification signal, and the monitor device 20 can easily identify any abnormal one of the second optical fiber transmission lines 4(#1) to 4(#N) according to the frequency of the corresponding identification signal.

Figure 13:
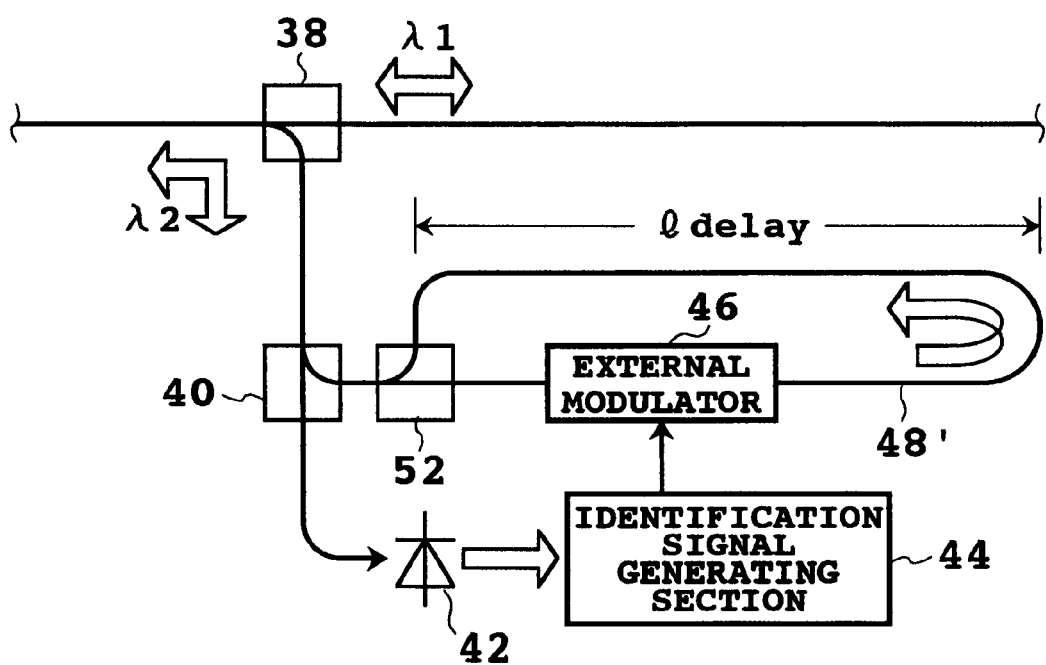
FIG. 13 is a block diagram showing another preferred embodiment of the external modulation unit 36 shown in FIG. 9.

FIG. 13 is a block diagram showing another preferred embodiment of each external modulation unit 36 shown in FIG. 9. In contrast to the preferred embodiment shown in FIG. 10 wherein the monitor light is reciprocated in the external modulator 46 to perform modulation of the monitor light according to the corresponding identification signal on the return path, the preferred embodiment shown in FIG. 13 is characterized in that the monitor light is only once passed through the external modulator 46 to perform modulation of the monitor light according to the corresponding identification signal at this time.

The monitor light dropped from each second optical fiber transmission line by the corresponding WDM coupler 38 is divided into two branch beams by the optical coupler 40. One of the two branch beams is supplied to the photodetector 42, and the other branch beam is supplied through an optical coupler 52 to the external modulator 46. The external modulator 46 modulates the input branch beam according to the identification signal from the identification signal generating section 44 to obtain an identification optical signal. The identification optical signal is next returned through a timing adjusting optical fiber 48' to the optical coupler 52. The optical coupler 52 functions as a directional coupler. Accordingly, the identification optical signal returned to the optical coupler 52 is supplied through the optical coupler 40 and the WDM coupler 38 in this order to each second optical fiber transmission line.

The reason for the provision of the timing adjusting optical fiber 48 or 48' in each external modulation unit 36 is to prevent all the identification optical signals from reaching the monitor device 20 with the same timing to allow the use of the single monitor device 20.

Figure 14:
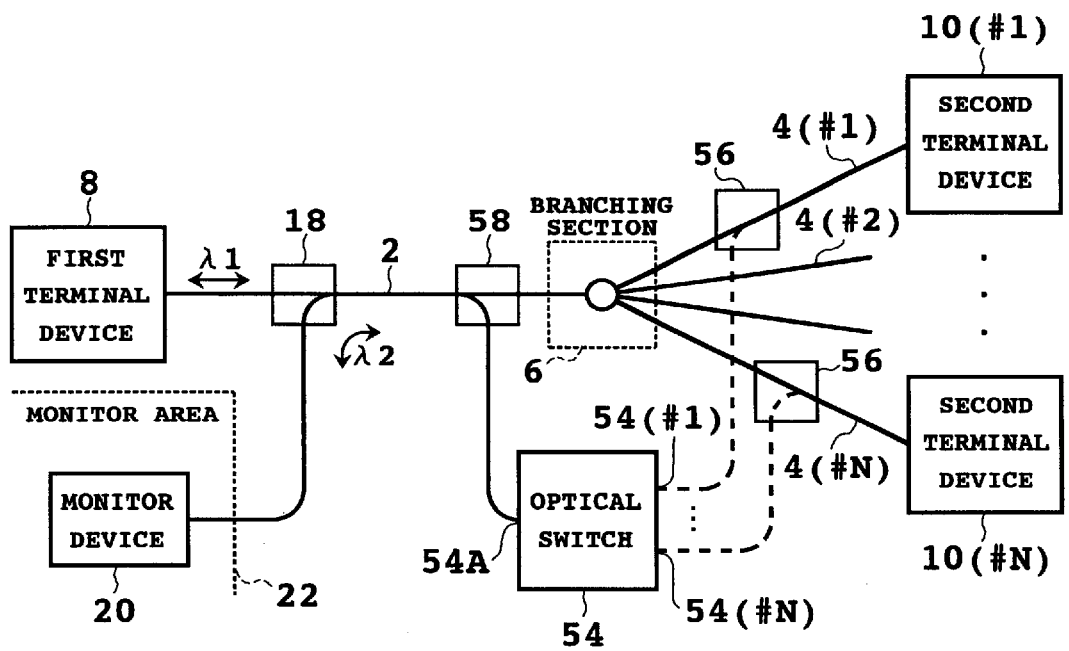
FIG. 14 is a block diagram showing a fourth preferred embodiment of the system according to the present invention.

FIG. 14 is a block diagram showing a fourth preferred embodiment of the system according to the present invention. In this preferred embodiment, a 1×N optical switch 54 is used to allow monitoring of a plurality of optical fiber transmission lines by the use of the single monitor device 20. The optical switch 54 has a first port 54A and N second ports 54(#1) to 54(#N). The first port 54A is selectively connected to one of the second ports 54(#1) to 54(#N).

The second ports 54(#1) to 54(#N) are optically connected to the second optical fiber transmission lines 4(#1) to 4(#N) by WDM couplers 56 in the vicinity of the branching section 6, respectively. The first port 54A functions to receive monitor light having a wavelength λ2 from the monitor device 20. Particularly in this preferred embodiment, the first port 54A is optically connected to the first optical fiber transmission line 2 between the WDM coupler 18 and the branching section 6 by a WDM coupler 58, so as to pass the monitor light through the first optical fiber transmission line 2.

Figure 15:
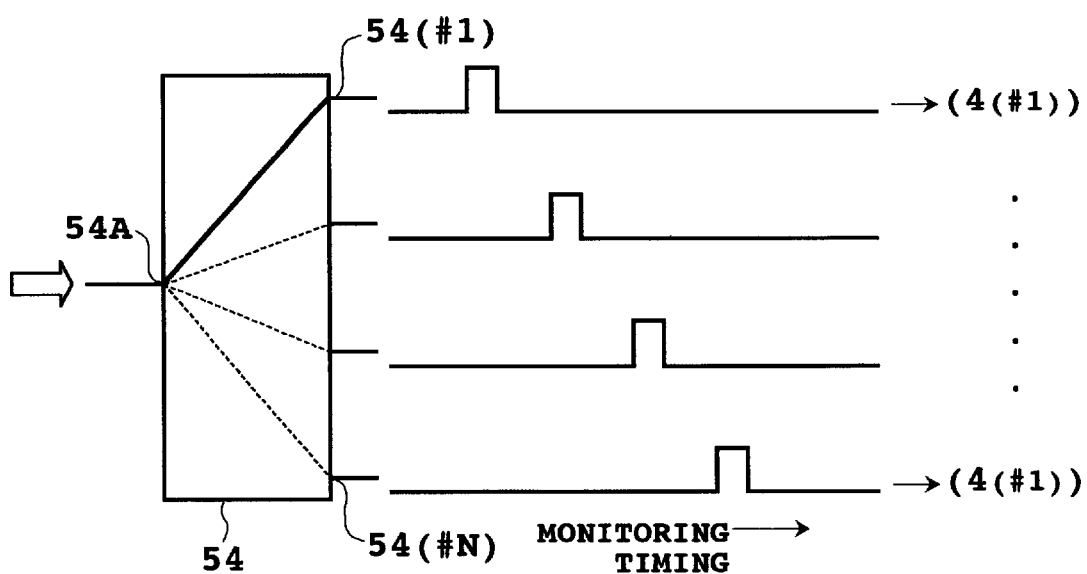
FIG. 15 is a diagram for illustrating the principle of operation in the fourth preferred embodiment.

FIG. 15 is a diagram for illustrating the principle of operation in the fourth preferred embodiment shown in FIG. 14. The monitor light output from the monitor device 20 is supplied through the WDM coupler 18, the first optical fiber transmission line 2, and the WDM coupler 58 in this order to the first port 54A of the optical switch 54, and is then output from a selected one of the second ports 54(#1) to 54(#N) (e.g., the second port 54(#1) as shown in FIG. 15). Accordingly, in the example shown, the second optical fiber transmission line 4(#1) can be monitored by performing OTDR, for example, using the monitor light. Furthermore, in the case that an abnormal point such as a break point is present in the optical fiber transmission line 4(#1), the abnormal point can be located.

By sequentially switching the second ports 54(#1) to 54(#N) of the optical switch 54, the above monitoring operation can be performed on all the optical fiber transmission lines 4(#1) to 4(#N).

The reason why the port 54A of the optical switch 54 is optically connected to the first optical fiber transmission line 2 by the WDM coupler 58 is to allow monitoring of the first optical fiber transmission line 2 by OTDR or the like as similarly to the previous preferred embodiments. Accordingly, in the case that the monitoring of the first optical fiber transmission line 2 is not required, the monitor device 20 may be optically connected directly to the port 54A of the optical switch 54 in this preferred embodiment, thereby eliminating the need for the WDM couplers 18 and 58 to simplify the configuration of the system.

As mentioned above, this preferred embodiment employs the 1×N optical switch 54 to allow the monitoring of the N second optical fiber transmission lines 4(#1) to 4(#N) by the single monitor device 20.

In each of the above preferred embodiments, optical fiber wiring in the monitor area 22 where the monitor device 20 is provided is dedicated only for the monitor device 20, so that the optical fiber wiring in the monitor area 22 can be made simpler than that in the conventional system shown in FIG. 1.

The frequencies of the identification signals described with reference to FIGS. 8A and 8B are set higher than the frequency corresponding to the bit rate (e.g., 50 Mb/s) of the main signal, for example.

According to the present invention as described above, it is possible to provide a method and system which can monitor a plurality of optical fiber transmission lines in a network by using a single monitor device. The other effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:
1. A system comprising:
   a first optical fiber transmission line;
   a plurality of second optical fiber transmission lines;
   a branching section for optically connecting said first optical fiber transmission line and said plurality of second optical fiber transmission lines;
   a monitor device optically connected to said first optical fiber transmission line; and
   a plurality of reflecting sections respectively provided in the vicinity of open ends of said plurality of second optical fiber transmission lines;
   said monitor device outputting monitor light through said first optical fiber transmission line and said branching section to each of said second optical fiber transmission lines;

said reflecting sections reflecting said monitor light to thereby generate identification optical signals having different patterns for respectively identifying said second optical fiber transmission lines.

2. A system according to claim 1, further comprising:
a first terminal device optically connected to an open end of said first optical fiber transmission line; and
a plurality of second terminal devices optically connected to said open ends of said plurality of second optical fiber transmission lines, respectively.

3. A system according to claim 2, wherein transmission using an optical signal having a first wavelength is performed between said first terminal device and each of said second terminal devices, said identification optical signal having a second wavelength different from said first wavelength.

4. A system according to claim 3, further comprising:
a WDM (wavelength division multiplexing) coupler arranged along said first optical fiber transmission line, for optically connecting said monitor device to said first optical fiber transmission line;
said WDM coupler coupling said first terminal device and said branching section by said first wavelength, and coupling said monitor device and said branching section by said second wavelength.

5. A system according to claim 1, wherein said monitor device comprises means for detecting an abnormality in each of said second optical fiber transmission lines according to the presence of absence of the corresponding identification optical signal.

6. A system according to claim 1, wherein:
each of said reflecting sections comprises a timing adjusting optical fiber for preventing said identification optical signals from reaching said monitor device with the same timing, and a reflector cascaded to said timing adjusting optical fiber;
said timing adjusting optical fiber and said reflector being arranged in this order from the side of said branching section;
said reflector having a plurality of reflection points for determining each of said patterns.

7. A system according to claim 6, wherein each of said reflection points is provided by a splice point between optical fibers.

8. A system comprising:
a first optical fiber transmission line;
a plurality of second optical fiber transmission lines;
a branching section for optically connecting said first optical fiber transmission line and said plurality of second optical fiber transmission lines;
a monitor device optically connected to said first optical fiber transmission line;
a first terminal device optically connected to an open end of said first optical fiber transmission line; and
a plurality of second terminal devices optically connected to open ends of said plurality of second optical fiber transmission lines, respectively;
said second terminal devices generating identification signals for respectively identifying said second optical fiber transmission lines;
said monitor device detecting an abnormality in each of said second optical fiber transmission lines according to the corresponding identification signal.

9. A system according to claim 8, wherein transmission using a main signal is performed between said first terminal device and each of said second terminal devices.

10. A system according to claim 9, wherein:
said identification signals have different patterns determined according to said second optical fiber transmission lines;
said main signal and each of said identification signals being time-division multiplexed.

11. A system according to claim 9, wherein:
said identification signals have different frequencies determined according to said second optical fiber transmission lines;
each of said identification signals being superimposed on said main signal.

12. A system comprising:
a first optical fiber transmission line;
a plurality of second optical fiber transmission lines;
a branching section for optically connecting said first optical fiber transmission line and said plurality of second optical fiber transmission lines;
a monitor device optically connected to said first optical fiber transmission line; and
a plurality of external modulation units optically connected to said plurality of second optical fiber transmission lines in the vicinity of open ends of said second optical fiber transmission lines, respectively;
said monitor device outputting monitor light through said first optical fiber transmission line and said branching section to each of said second optical fiber transmission lines;
said external modulation units modulating said monitor light according to identification signals for respectively identifying said second optical fiber transmission lines to thereby generate identification optical signals, respectively.

13. A system according to claim 12, wherein said identification signals have different patterns determined according to said second optical fiber transmission lines.

14. A system according to claim 12, wherein said identification signals have different frequencies determined according to said second optical fiber transmission lines.

15. A system according to claim 12, further comprising:
a first terminal device optically connected to an open end of said first optical fiber transmission line; and
a plurality of second terminal devices optically connected to said open ends of said plurality of second optical fiber transmission lines, respectively.

16. A system according to claim 15, wherein transmission using an optical signal having a first wavelength is performed between said first terminal device and each of said second terminal devices, said identification optical signal having a second wavelength different from said first wavelength.

17. A system comprising:
a first optical fiber transmission line;
N second optical fiber transmission lines (N is an integer greater than 1);
a branching section for optically connecting said first optical fiber transmission line and said plurality of second optical fiber transmission lines;
a 1×N optical switch having a first port and N second ports, said second ports being optically connected to said second optical fiber transmission lines, respectively, in the vicinity of said branching section, said first port being selectively connected to one of said second ports; and a monitor device optically connected to said first port of said 1×N optical switch for outputting monitor light to each of said second optical fiber transmission lines.

18. A system according to claim 17, further comprising means for passing said monitor light through said first optical fiber transmission line.

19. A method for monitoring a plurality of optical fiber transmission lines optically connected together by a branching section, comprising the steps of:

(a) identifying an abnormal one of said optical fiber transmission lines; and (b) locating an abnormal point in said abnormal optical fiber transmission line identified above.

20. A method according to claim 19, wherein:

said step (a) comprises the steps of providing a plurality of reflecting sections in the vicinity of open ends of said optical fiber transmission lines, respectively, and supplying monitor light through said branching section to said optical fiber transmission lines;

said reflecting sections reflecting said monitor light to thereby generate identification optical signals having different patterns for respectively identifying said optical fiber transmission lines.

* * * * *